J. J. BAUSCH.
Microscope.
No. 47,382.
Patented April 25, 1865.
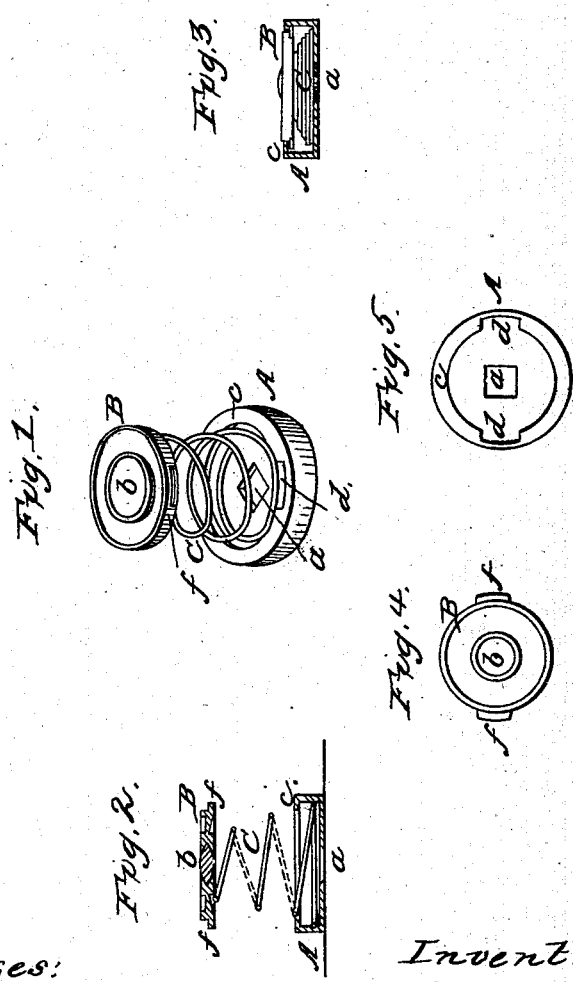

UNITED STATES PATENT OFFICE.

J. J. BAUSCH, OF ROCHESTER, NEW YORK, ASSIGNOR TO BAUSCH & LOMB, OF SAME PLACE.

IMPROVEMENT IN MICROSCOPES.

Specification forming part of Letters Patent No. 47,382, dated April 25, 1865.

*To all whom it may concern:*

Be it known that I, J. J. BAUSCH, of Rochester, in the county of Monroe and State of New York, have invented a new and useful Improvement in Pocket-Microscopes; and I do hereby declare that the following is a full and exact description thereof, reference being had to the accompanying drawings, making a part of this specification.

Figure 1 is a perspective view of my improved microscope opened or extended in the condition for examining an object; Fig. 2, a central vertical section in the same position; Fig. 3, a similar section, but with the microscope shut or closed together in the condition for carrying in the pocket; Fig. 4, a plan of the eye-piece of the microscope; Fig. 5, a plan of the object-piece.

Like letters of reference indicate corresponding parts in all the figures.

It is the object of my improvement to produce a simple microscope for ordinary use that is capable of being closed or shut into compact form, so as to be carried in the pocket; and my invention consists in the combination of an object or base piece, an eye-piece, and a spring, so arranged that the reaction or extension of the spring will separate the eye and object pieces a distance just equal to the focus of the lens, and so arranged that when closed the eye-piece shuts within the object piece, and holds there by means of small lips or flanges on the former, that enter corresponding notches or depressions of the latter.

As represented in the drawings, A is the object or base piece of the microscope, having a central opening, *a*, for viewing the object; B, the eye-piece, having an ordinary lens, *b*, and C a spiral spring connecting the two, being preferably of conical shape, so that when compressed it will easily shut into the object-piece, as clearly represented in Fig. 3. The object-piece A is made hollow or of dish form, and is provided at the top with a projecting horizontal rim *c*, Figs. 3 and 5, in which, at suitable positions, are made two or more notches, *d d*, substantially of the shape shown. At corresponding positions the eye-piece B is also provided with projecting lips or flanges *f f*, so that when the eye and object pieces are brought together the lips *f f* will enter the notches *d d*, then a slight turning movement of the eye-piece (which the spring allows) brings the flanges under the rim *c*, and the two parts hold securely together.

The advantages of this arrangement are, first, that the device can be compressed into a very compact form, so as to be carried in the pocket easily, occupying scarely more space than an ordinary-sized button, and it is in the most convenient shape, there being no projecting parts; second, when opened, the focus is exactly adjusted, as the reaction of the spring is just the focus of the lens, thereby saving an adjustment that is required in all ordinary microscopes. If the spring is made of good brass wire, this focus will remain very accurate.

What I claim as my invention, and desire to secure by Letters Patent, is—

The combination of the object-piece A, eye-piece B, and spring C, substantially as and for the purpose herein set forth.

In witness whereof I have hereunto signed my name in the presence of two subscribing witnesses.

J. J. BAUSCH.

Witnesses:
R. F. OSGOOD,
JAY HYATT.